United States Patent [19]

Ichikawa

[11] Patent Number: 5,322,198
[45] Date of Patent: Jun. 21, 1994

[54] PUMP-EQUIPPED LIQUID SUPPLY SYSTEM

[75] Inventor: Hideo Ichikawa, Numazu, Japan

[73] Assignee: Ricoh Company, Ltd., Tokyo, Japan

[21] Appl. No.: 81,109

[22] Filed: Jun. 25, 1993

[30] Foreign Application Priority Data

Jun. 26, 1992 [JP] Japan .................................. 4-050929

[51] Int. Cl.[5] .......................................... G01F 11/02
[52] U.S. Cl. .................... 222/321; 222/376; 222/385; 222/DIG. 1
[58] Field of Search ............... 222/321, 376, 377, 378, 222/382, 383, 385, DIG. 1

[56] References Cited

U.S. PATENT DOCUMENTS

| 351,538 | 10/1886 | Sims | 222/385 X |
|---|---|---|---|
| 597,477 | 1/1898 | Wine | 222/321 X |
| 774,889 | 11/1904 | Murphy | 222/377 X |
| 963,268 | 7/1910 | Becker | 222/321 |
| 1,180,221 | 4/1916 | Adams | 222/385 X |
| 1,936,526 | 11/1933 | Seidel | 222/385 X |
| 2,548,752 | 4/1951 | Titus | 222/321 X |
| 3,885,709 | 5/1975 | Levy | 222/DIG. 1 |
| 4,795,063 | 1/1989 | Sekiguchi et al. | 222/321 X |
| 5,248,847 | 9/1993 | Aoyama | 222/DIG. 1 |
| 5,255,828 | 10/1993 | Ichikawa | 222/321 |

Primary Examiner—Andres Kashnikow
Assistant Examiner—Kenneth Bombers
Attorney, Agent, or Firm—Oblon, Spivak, McClelland, Maier & Neustadt

[57] ABSTRACT

A liquid supply system with a pump for discharging fixed amounts of liquid composed of a liquid supply vessel which holds a liquid therein; a cylinder device composed of a cylinder cover and a cylinder with a bottom portion having a piston hole, a first liquid suction hole with a liquid suction valve and a second liquid suction hole; a piston device which is slidably disposed within the cylinder, including a piston with a liquid suction inlet and a liquid inlet valve, and a valve-pressing member, a piston cover provided above the piston to form an inner space therebetween to hold the liquid therein, a piston shaft which, in a sealed state, passes through the piston hole formed in the bottom portion of the cylinder, and is integrally connected with the piston in such a manner as to slidably move the piston device along the inner side of the cylinder when pressed upward or downward, the piston shaft including herein a liquid discharge conduit which is connected to the inner space of the piston device and from which the liquid can be discharged for use, and an air displacement port; a spring member; and a cradle on which a seal-packing member is provided so as to tightly close the second liquid developer suction hole when the piston device is at the lowest position.

1 Claim, 5 Drawing Sheets

PUMP-EQUIPPED LIQUID SUPPLY SYSTEM

BACKGROUND OF THE INVENTION

1. Field of the Invention

The present invention relates to a pump-equipped liquid supply system for discharging fixed amounts of a liquid to a liquid tank in such a manner that the liquid held in the liquid tank is maintained constant.

2. Discussion of Background

Examples of conventionally known liquid supply systems for supplying a liquid to a tank containing the liquid to maintain the amount of the liquid in the tank constant are: (1) a liquid developer supply unit which is incorporated into an electrophotographic copying machine and from which a liquid therein is discharged by its own weight from the unit into the electrophotographic copying machine; and (2) a liquid supply unit which is pre-pressurized to discharge a liquid into a tank.

However, there are many problems associated with such conventional liquid supply systems. For example, it is difficult to control the supply of fixed amounts of a liquid by using the aforementioned unit (1), and a special device is required for the application of a constant pressure for the pre-pressurizing in the unit (2).

The applicant of the present application has proposed a pump-equipped liquid developer supply system as shown in FIG. 5, capable of reliably supplying a fixed amount of a liquid developer held in a pump-equipped liquid developer supply vessel to a developer tank at each operation of the pump without providing any pressurizing means, as Japanese Utility Model Application 3-26080 (which corresponds to a copending U.S. application No. 07/800,490) now U.S. Pat. No. 5,255,828, Oct. 26, 1993.

In FIG. 5, reference numeral 1 indicates a liquid developer vessel, reference numeral 20, an air displacement pipe; reference numeral 21, a cylinder cover through which the air displacement pipe 20 passes; reference numeral 22, a cylinder; reference numeral 23, a valve for a liquid developer introducing port; reference numeral 24, a piston cover; reference numeral 25, a piston; reference numeral 26, a lower space portion of the cylinder 22; reference numeral 27, a first liquid developer suction hole through which the liquid developer is sucked from a liquid developer supply vessel; reference numeral 27', a second liquid developer suction hole; reference numeral 40, a piston shaft; reference numeral 28, a liquid developer discharge conduit which is formed within the piston shaft 40 for discharging the liquid developer to a developer tank 50; reference numerals 29 and 30, sealing members; reference numeral 32, a liquid developer suction valve; reference numeral 33, a liquid developer inlet valve; reference numeral 34, a liquid developer inlet valve; reference numeral 35, a spring which urges the piston 25 downward; reference numeral 36, an upper space formed above the piston cover 24; reference numeral 41, an air displacement port; and reference numeral 51, a solenoid.

The operation of this pump-equipped liquid developer supply vessel is as follows: when the piston shaft 40 is pushed upward in the direction B shown by the arrow by the action of the solenoid 51, as indicated in FIG. 5, the liquid developer suction valve 32 opens so that a fixed volume of the liquid developer in the developer supply vessel 1 is drawn into the lower space 26 in the cylinder 22. At the same time, the liquid developer inlet valve 34 is opened and the liquid developer is drawn out from the upper space 36 in the cylinder 22, passes through the liquid developer conduit 28 in the piston shaft 40, and is discharged therefrom to the liquid developer tank 50.

Then, after the piston shaft 40 has completed its upward movement, when the piston 25 is pressed down in the direction A by the action of the spring 35, as indicated the valve 23 is opened and a fixed amount of the liquid developer is drawn into the upper space 36 in the cylinder 22. At the same time, the liquid developer inlet valve 33 is opened and the liquid developer is discharged into the developer tank 50 through the liquid developer discharge conduit 28 formed within the piston shaft 40.

As the liquid developer is discharged from the supply vessel 1 to the developer tank 50, the air in the tank is introduced into the bottom of the liquid developer supply vessel through the air displacement port 41 and through the air displacement pipe 20.

In the above-described pump-equipped liquid developer supply system shown in FIG. 5, the liquid developer is simultaneously drawn into the pump portion of the supply vessel 1 and discharged to the developer tank 50 by the action of the piston in either of the directions A or B.

In the above pump-equipped liquid developer supply system, however, when the internal pressure of the liquid developer supply vessel is extraordinarily increased, there is a problem in that the liquid developer leaks from an outlet of a liquid outlet 28 and/or from an air displacement port 41.

More specifically, with reference to FIG. 5, when the internal pressure of a pump-equipped liquid developer supply vessel 1 filled with a liquid developer is increased, for instance, by the increase of the temperature therein, the liquid developer enters the cylinder 22 through the first liquid developer suction hole 27 and the second liquid suction hole 27' and leaks into the developer tank 50 through the liquid developer discharge conduit 28.

In addition, when this kind of pump-equipped liquid developer supply vessel 1 is incorporated into an electrophotographic copying machine, there is a problem in that the liquid developer in the developer supply vessel 1 enters an air displacement pipe 20 and leaks from the air displacement port 41.

SUMMARY OF THE INVENTION

Accordingly, an object of the present invention is to provide a pump-equipped liquid supply system capable of reliably supplying a fixed amount of a liquid to a tank during each operation, free from the conventional problems of leakage of the liquid, without the provision of a pressurizing means.

The above-mentioned object of the present invention can be achieved by a liquid supply system with a pump for discharging fixed amounts of liquid which comprises:

a liquid supply vessel which holds a liquid therein, a cylinder, disposed within the supply vessel, with a bottom portion having a piston hole, a first liquid suction hole with a liquid suction valve, and a second liquid suction hole, the first and second suction holes opening into the liquid supply vessel, a piston device which is slidably disposed within the cylinder, the piston device comprising (1) a piston with a liquid suction inlet, a liquid inlet valve, and a valve-pressing member which can be brought into pressure contact with the liquid developer suction valve for the first liquid suction hole so that the first liquid suction hole is tightly closed by the liquid developer suction valve, (2) a piston cover which is provided above the piston to form an inner space therebetween to hold the liquid therein, and an upper space above the piston cover within the cylinder to hold the liquid therein, the piston cover comprising a liquid suction inlet with a liquid inlet valve to draw the liquid into the inner space from the upper space, and a liquid introducing port with a valve which is connected to the second liquid suction hole of the cylinder, passing through the inner space, through which the liquid is caused to enter the upper space, (3) a piston shaft which, in a sealed state, passes through the piston hole formed in the bottom portion of the cylinder, and is integrally connected with the piston in such a manner as to slidably move the piston device along the inner side of the cylinder, when pressed upward or downward, the piston shaft including therein a liquid discharge conduit which is connected to the inner space of the piston device and from which the liquid can be discharged for use, the bottom portion of the cylinder and the piston being capable of forming a lower space therebetween when the piston device is moved upward to draw the liquid thereinto through the first liquid suction hole with the liquid suction valve from the liquid supply vessel, the liquid being supplied to the inner space of the piston device from the lower space between the bottom portion of the cylinder and the piston and to the upper space through the second liquid suction hole, and discharged from the liquid discharge conduit for use when the piston device is moved downward, and (4) an air displacement port through which air is caused to flow into the supply vessel when the liquid is drawn into the lower space from the supply vessel, a spring member which urges the piston device downward, and a cradle member which is fixed to the cylinder or the liquid supply vessel and is provided with a seal-packing member in such a configuration that the second suction hole formed in the bottom portion of the cylinder comes into close contact with the seal-packing member to tightly close the second suction hole when the piston device comes to its lowest position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
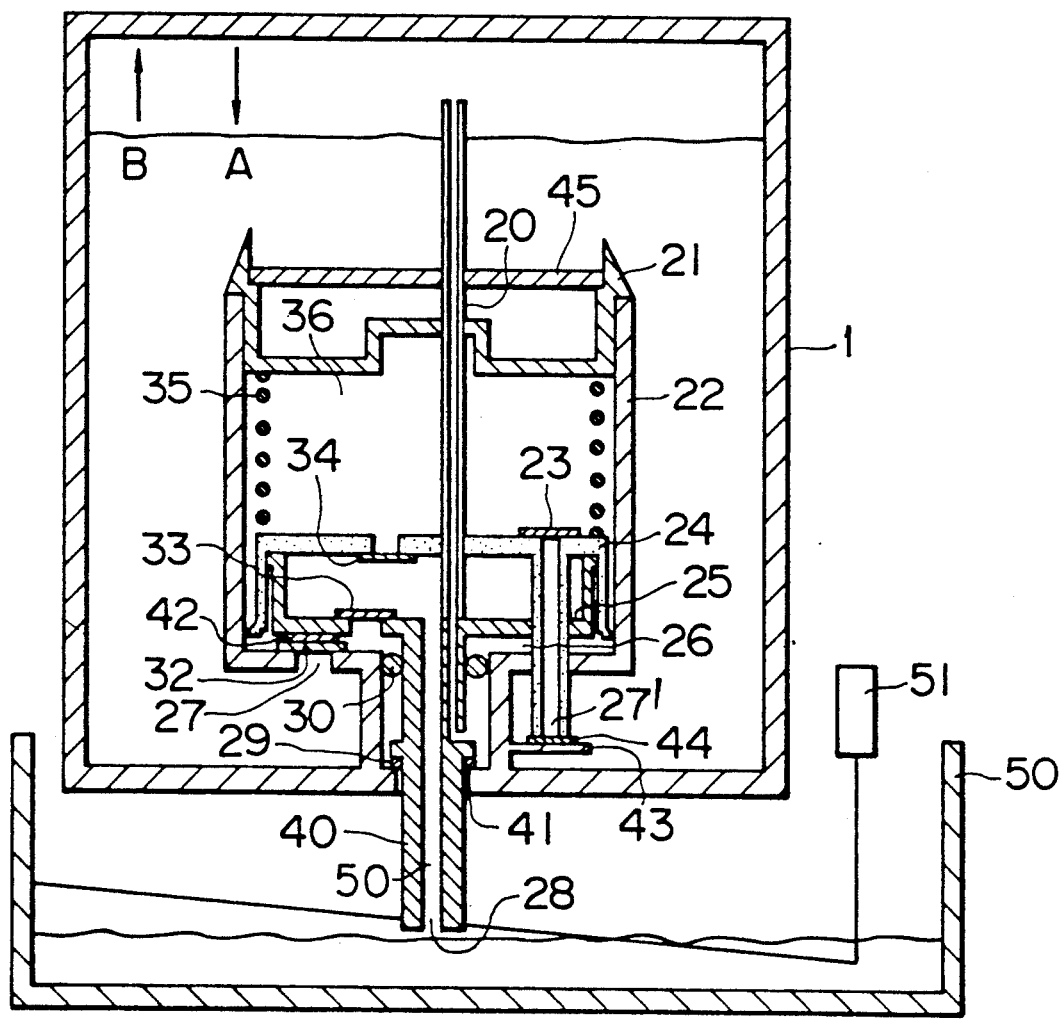
FIG. 1 is a schematic cross-sectional view of an embodiment of a pump-equipped liquid supply system according to the present invention.

The present invention will now be explained in detail with reference to the accompanying drawings, wherein like reference numerals designate identical or corresponding parts throughout the several views, and more particularly to FIG. 1 thereof.

FIG. 1 is a schematic cross-sectional view of a pump-equipped liquid supply system of the present invention.

In FIG. 1, reference numeral 1 indicates a liquid supply vessel; reference numeral 50, a tank; reference numeral 51, a solenoid; reference numeral 20, an air displacement pipe which extends to a bottom portion of the liquid supply vessel 1 (in FIG. 1, the bottom portion of the liquid supply vessel 1 at an upper position since the liquid supply vessel 1 which is reversed in position in FIG. 1; reference numeral 21, a cylinder cover; reference numeral 22, a cylinder; reference numeral 24, a piston cover; reference numeral 23, a valve provided on the piston cover 24; reference numeral 25, a piston; reference numeral 26, a lower space portion of the cylinder 22; reference numeral 27, a first suction valve formed in the bottom portion of the cylinder 22 through which the liquid is sucked from the liquid supply vessel 1 into the piston 25; reference numeral 27', a second liquid suction hole provided on the bottom portion of the cylinder 22, through which the liquid is sucked from the liquid supply vessel 1 into the piston 25; reference numeral 28, a liquid discharge conduit which is formed within a piston shaft 40, through which the liquid is discharged into the liquid tank 50; reference numerals 29 and 30, sealing members; reference numeral 32, a liquid suction valve; reference numeral 33, a liquid suction valve through which the liquid is discharged from the lower space portion 26 of the cylinder 22 into the liquid discharge conduit 28 when the piston 25 is moved downward; reference numeral 36, an upper space portion of the cylinder 22; reference numeral 34, a liquid inlet valve through which the liquid is sucked from the upper space portion of the cylinder 22 to discharge the liquid into the liquid discharge conduit 28 when the piston 25 is moved upward; reference numeral 35, a spring which urges the piston 25 downward; reference numeral 40, the above-mentioned piston shaft with the inner liquid discharge conduit 28 through which the liquid is discharged into the tank 50; reference numeral 41, an air displacement port; reference numeral 42, a valve-pressing member which is provided on bottom of the piston 25 to apply pressure to the liquid suction valve 32 to tightly hold the liquid suction valve 32; reference numeral 43, a cradle which is integral with or fixed to the cylinder 22 (or the liquid supply vessel), provided with a seal-packing member 44; and reference numeral 45, a liquid back-flow preventing member.

Figure 2:
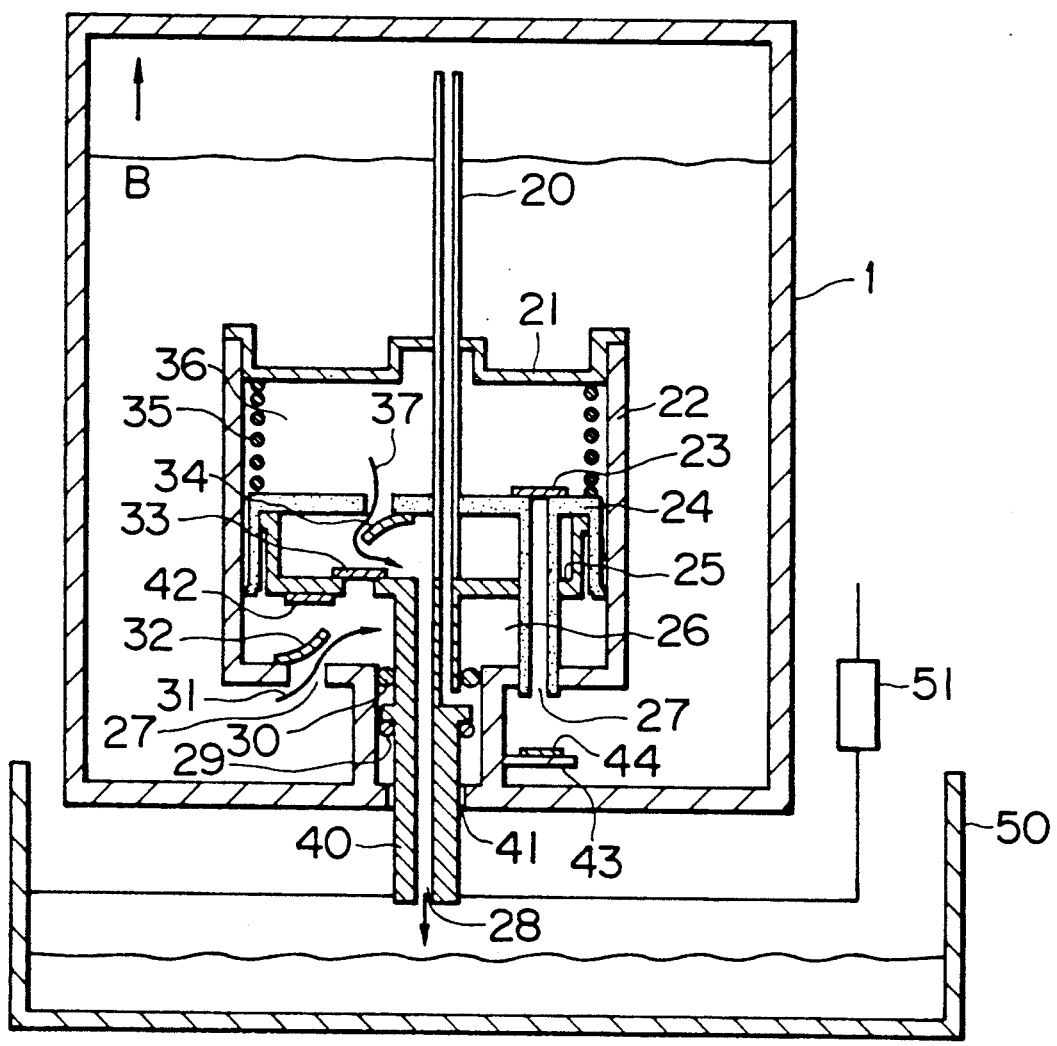
FIGS. 2 through 4 are schematic cross-sectional views of the pump-equipped liquid supply system shown in FIG. 1, in explanation of the operation for supplying fixed amounts of liquid to a tank.
Figure 3:
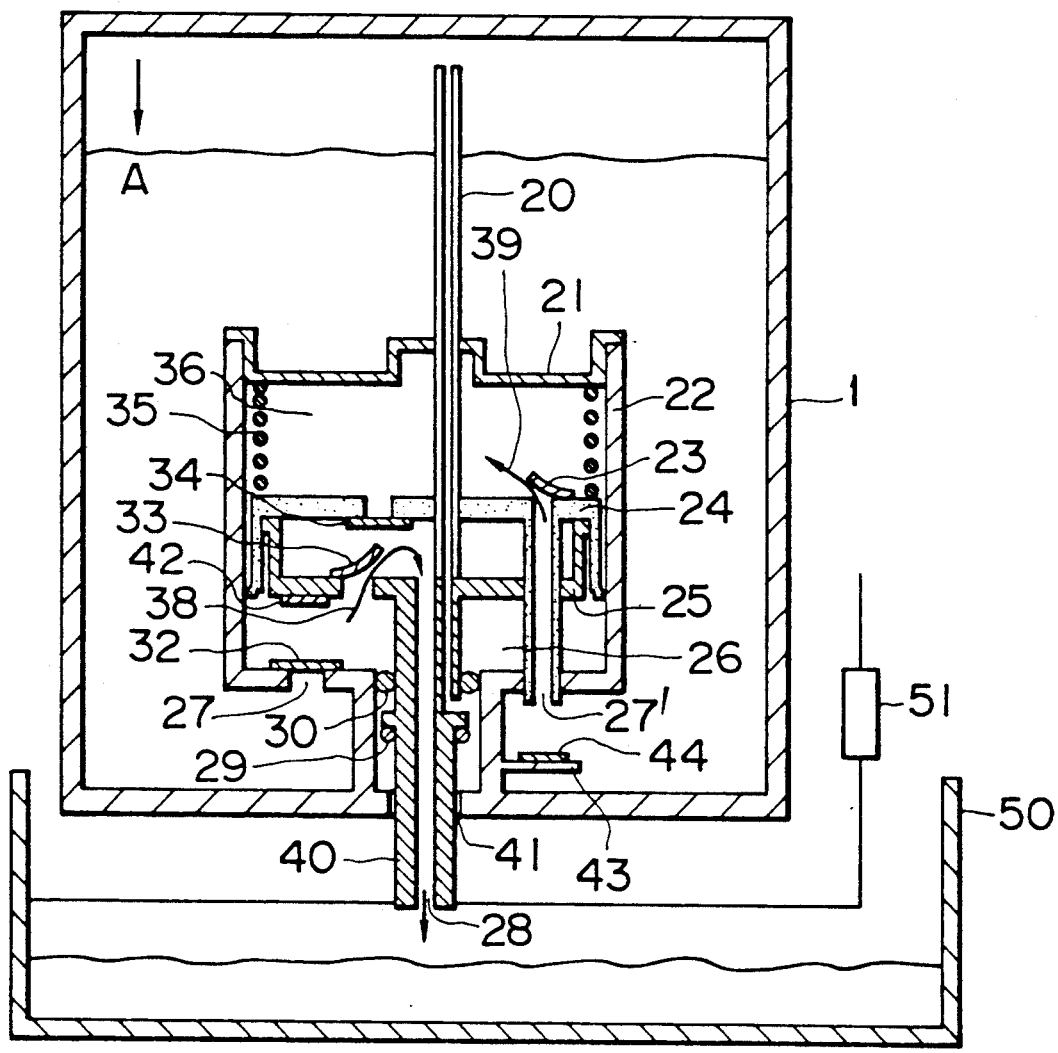
Figure 4:
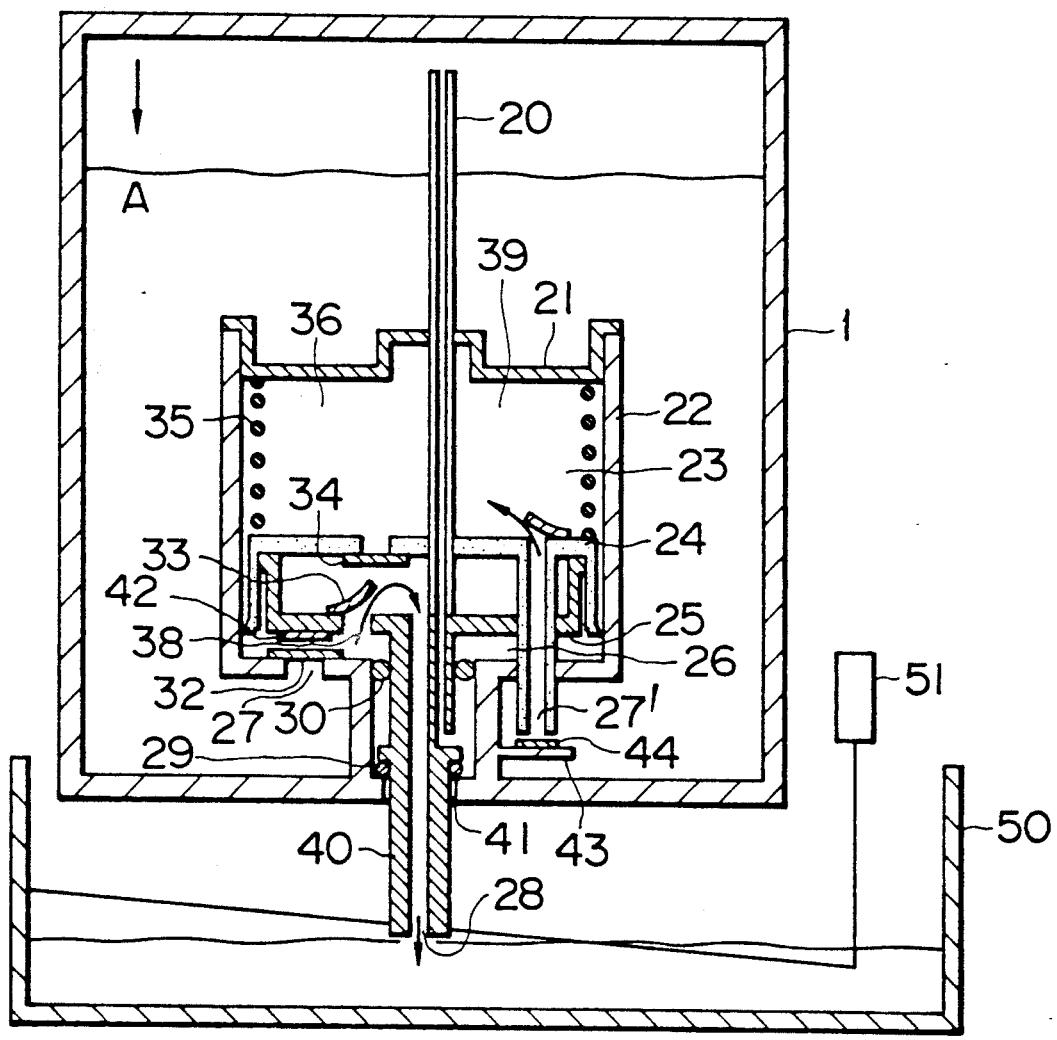
Figure 5:
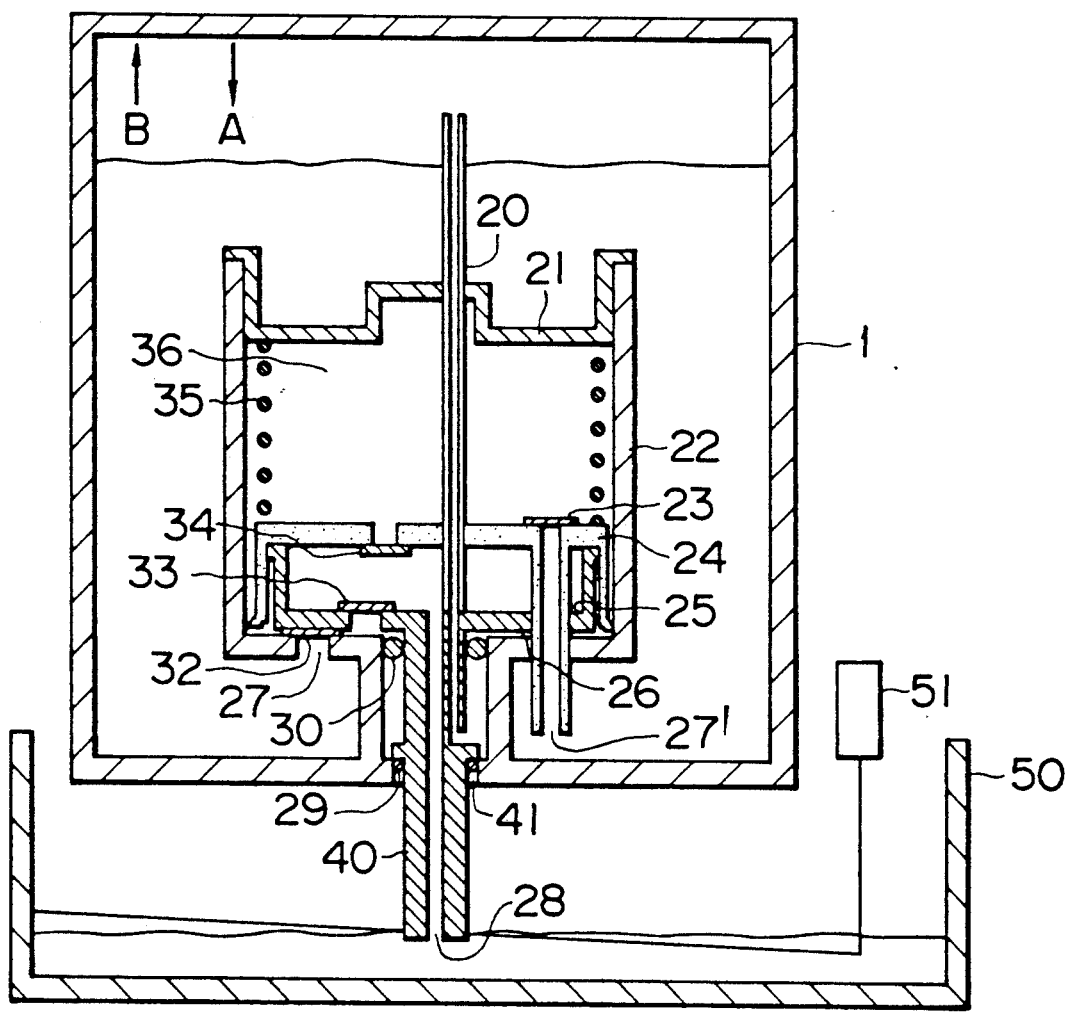
FIG. 5 is a schematic cross-sectional view of a comparative pump-equipped liquid supply system.

FIGS. 2 through 4 are cross-sectional views for explaining the positioning relationship among the pump-equipped liquid supply vessel of the present invention, the pump portion of the liquid supply vessel and a tank, and the mechanism of supplying a predetermined amount of liquid to the tank.

As shown in FIG. 2, a pump portion is fixed in a liquid supply vessel 1, and the liquid discharge conduit 28 opens into the tank 50. The pump-equipped liquid supply vessel 1 is filled with the liquid.

Further, as shown in FIG. 2, when the liquid in the tank 50 is consumed so that the liquid surface level drops below a preset lower limit level, a liquid level detection means (not shown) generates a signal through which a solenoid 51 is activated for a predetermined period of time. As a result, the piston shaft 40 in the pump portion of the pump-equipped liquid supply vessel 1, linked to the solenoid 51, is moved in the direction B as indicated by the arrow in FIG. 2.

As the piston shaft 40 is moved upward, the liquid inlet valve 32 is opened and a fixed amount of the liquid is caused to flow from the first liquid suction hole 27 in the direction of an arrow 31, and is drawn into the lower space portion 26 of the cylinder 22. At the same time, the liquid inlet valve 34 provided on the piston cover 24 is opened, so that the liquid is drawn into an inner space formed between the piston 25 and the piston cover 24 from the upper space portion 36 formed between the piston cover 24 and the cylinder cover 21 and discharged into the tank 50 through the liquid discharge conduit 28 formed within the piston shaft 40.

When an adequate amount of the liquid is supplied to the tank 50, the upward movement of the piston shaft 40 is terminated.

When the liquid contained in the tank 50 is again decreased and the liquid surface level drops below the preset lower limit level, the piston 25 is pushed downward by the spring 35 in the direction A as indicated by the arrow in FIG. 3. At this moment, the valve 23 is opened and a fixed amount of the liquid is drawn into the upper space portion 36 of the cylinder 22 from the second liquid suction hole 27'. At the same time, the liquid inlet valve 33 is opened, the liquid is sucked in the direction of an arrow 38 from the lower space portion 26 of the cylinder 22 into the inner space between the piston cover 24 and the piston 25, and discharged into the tank 50 through the liquid discharge conduit 28 formed within the piston shaft 40 as shown in FIG. 3 and FIG. 4.

In FIG. 4, the lower limit level of the liquid surface in the tank 50 is set lower than that in FIG. 3.

As the liquid is discharged from the liquid supply vessel 1 to the tank 50 through the liquid discharge conduit 28, air is introduced into the bottom of the liquid supply vessel 1 through the air displacement port 41 and through the air displacement pipe 20. In FIGS. 1 through 5, the liquid supply vessel 1 is placed upside down, so that the bottom of the liquid supply vessel 1 is situated in the upper position in those figures.

In the above-described embodiment of the pump-equipped liquid supply system of the present invention shown in FIGS. 2 through 4, the liquid is simultaneously drawn into the pump portion of the liquid supply vessel 1 and discharged to the tank 50 by the action of the piston 25 either in the direction A or in the direction B. Specifically, one reciprocating action of the piston 25 activated by one operation of the solenoid 51 can twice supply a fixed amount of the liquid to the tank 50.

Furthermore, the pump-equipped liquid supply system according to the present invention is designed to prevent the leakage of the liquid therefrom. As shown in FIG. 1, when the pump portion of the liquid supply vessel 1 is not operated, that is, when the liquid surface level of the liquid in the tank 50 is in a tolerable range, the liquid inlet valve 32 is tightly held by the valve-pressing member 42, so that even when the inner pressure of the liquid supply vessel 1 is increased, the liquid never enters the pump from the first liquid suction hole 27.

Furthermore, in this case, since the second liquid suction hole 27' is tightly closed with a seal-packing member 44 which is provided on the cradle 43, the liquid can be prevented from entering the cylinder 22 through the second liquid suction hole 27' even though the internal pressure of the liquid supply vessel 1 is increased.

When the liquid back-flow preventing member 45 is provided in close contact with the inside of the cylinder cover 21 as shown in FIG. 1, the liquid never enters the air displacement pipe.

According to the liquid supply system of the present invention, as previously described, a fixed amount of the liquid can reliably be supplied to the tank at each operation, using a simple device without the provision of a pressurizing means. In addition, the leakage of the liquid can be avoided even though the internal pressure of the liquid supply vessel is increased during the storage or the transportation.

What is claimed is:

1. A pump-equipped liquid supply system comprising:
a liquid supply vessel which holds a liquid therein,
a cylinder, disposed within said supply vessel, with a bottom portion having a piston hole, a first liquid suction hole with a liquid suction valve, and a second liquid suction hole, said first and second suction holes opening into said liquid supply vessel,
a piston device which is slidably disposed within said cylinder, said piston device comprising (1) a piston with a liquid suction inlet, a liquid inlet valve, and a valve-pressing member which can be brought into pressure contact with said liquid developer suction valve for said first liquid suction hole so that said first liquid suction hole is tightly closed by said liquid developer suction valve, (2) a piston cover which is provided above said piston to form an inner space therebetween to hold said liquid therein, and an upper space above said piston cover within said cylinder to hold said liquid therein, said piston cover comprising a liquid suction inlet with a liquid inlet valve to draw said liquid into said inner space from said upper space, and a liquid introducing port with a valve which is connected to said second liquid suction hole of said cylinder, passing through said inner space, through which said liquid is caused to enter said upper space, (3) a piston shaft which, in a sealed state, passes through said piston hole formed in said bottom portion of said cylinder, and is integrally connected with said piston in such a manner as to slidably move said piston device along the inner side of said cylinder, when pressed upward or downward, said piston shaft including therein a liquid discharge conduit which is connected to said inner space of said piston device and from which said liquid can be discharged for use, said bottom portion of said cylinder and said piston being capable of forming a lower space therebetween when said piston device is moved upward to draw said liquid thereinto through said first liquid suction hole with said liquid suction valve from said liquid supply vessel, said liquid being supplied to said inner space of said piston device from said lower space between said bottom portion of said cylinder and said piston and to said upper space through said second liquid suction hole, and discharged from said liquid discharge conduit for use when said piston device is moved downward, and (4) an air displacement port through which air is caused to flow into said supply vessel when said liquid is drawn into said lower space from said supply vessel,
a spring member which urges said piston device downward, and
a cradle member which is fixed to said cylinder or said liquid supply vessel and is provided with a seal-packing member in such a configuration that said second suction hole formed in said bottom portion of said cylinder comes into close contact with said seal-packing member to tightly close said second suction hole when said piston device comes to its lowest position.

* * * * *